US010210484B2

(12) United States Patent
Bostick et al.

(10) Patent No.: US 10,210,484 B2
(45) Date of Patent: Feb. 19, 2019

(54) ALTERING A FUNCTIONAL CHARACTERISTIC OF A COMPUTER USED BY AN INVITEE TO A MEETING (71) Applicant: INTERNATIONAL BUSINESS MACHINES CORPORATION, Armonk, NY (US)

(72) Inventors: James E. Bostick, Cedar Park, TX (US); Hernan A. Cunico, Holly Springs, NC (US); John M. Ganci, Jr., Cary, NC (US); Martin G. Keen, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 548 days.

(21) Appl. No.: 14/732,016

(22) Filed: Jun. 5, 2015

(65) Prior Publication Data

US 2016/0358126 A1 Dec. 8, 2016

(51) Int. Cl.
G06Q 10/00 (2012.01)
G06Q 10/10 (2012.01)
H04W 4/021 (2018.01)

(52) U.S. Cl.
CPC ........ *G06Q 10/1095* (2013.01); *H04W 4/021* (2013.01)

(58) Field of Classification Search
CPC ............................. G06Q 10/00; G06Q 30/02
USPC ................................................ 705/7.11–7.42
See application file for complete search history.

(56) References Cited

U.S. PATENT DOCUMENTS

| 7,765,119 | B2 | 7/2010 | Messa | |
|---|---|---|---|---|
| 7,937,380 | B2 | 5/2011 | Spiegelman et al. | |
| 8,442,851 | B2* | 5/2013 | Ryan | G06Q 10/06312 379/202.01 |
| 8,621,585 | B2* | 12/2013 | Danieli | H04L 12/1818 713/150 |
| 2004/0199580 | A1* | 10/2004 | Zhakov | H04L 12/1818 709/204 |
| 2007/0016661 | A1* | 1/2007 | Malik | G06Q 10/109 709/223 |

(Continued)

OTHER PUBLICATIONS

Anonymous, "System and Method for Integration of Calendar Schedules Using Social Networks and Messaging Clients", ip.com, No. 000212014, Oct. 25, 2011, pp. 1-5.

(Continued)

*Primary Examiner* — Robert D Rines
(74) *Attorney, Agent, or Firm* — Law Office of Jim Boice (57) ABSTRACT

A method, system, and/or computer program product alters a functional characteristic of a computer used by an invitee to a new meeting. A request to create a new meeting invitation for a new meeting to an invitee is received. Content from a previous meeting to which the invitee was invited is retrieved, where the first content includes a similar subject as the subject of the new meeting and whether the invitee attended the previous meeting. Based on this content, a date, time, and duration of the new meeting is determined, and a new meeting invitation is transmitted to an invitee's computer used by the invitee. A server receives a response to the new meeting invitation and a status of the invitee, and initiates an alteration of a functional characteristic of the invitee's computer based on the response from the invitee and the status of the invitee.

19 Claims, 6 Drawing Sheets (56) References Cited

U.S. PATENT DOCUMENTS

| | | | |
|---|---|---|---|
| 2008/0091778 A1* | 4/2008 | Ivashin | G06Q 10/10 |
| | | | 709/204 |
| 2009/0217176 A1 | 8/2009 | Coulomb et al. | |
| 2011/0279634 A1* | 11/2011 | Periyannan | H04N 7/141 |
| | | | 348/14.09 |
| 2012/0004942 A1 | 1/2012 | Callanan et al. | |
| 2012/0150581 A1 | 6/2012 | McPhail | |
| 2012/0150956 A1* | 6/2012 | Tucker | H04L 65/1069 |
| | | | 709/204 |
| 2013/0246116 A1 | 9/2013 | Bank et al. | |
| 2013/0304924 A1 | 11/2013 | Dhara et al. | |
| 2014/0035949 A1 | 2/2014 | Singh et al. | |
| 2014/0200940 A1 | 7/2014 | Putterman et al. | |

OTHER PUBLICATIONS

Anonymous, "Smart and Privacy Aware Inclusion of Travel Time Into the Calendar", ip.com, No. 000219039, Jun. 18, 2012, pp. 1-12.

P. Mell et al., "The NIST Definition of Cloud Computing", National Institute of Standards and Technology, Information Technology Laboratory, Sep. 2011, pp. 1-7.

\* cited by examiner

ALTERING A FUNCTIONAL CHARACTERISTIC OF A COMPUTER USED BY AN INVITEE TO A MEETING

BACKGROUND

The present disclosure relates to the field of computers, and specifically to the field of computers that are connected to a network. Still more specifically, the present disclosure relates to the field of modifying the functionality of a computer based on an invitee's response to a meeting invitation received via a network.

SUMMARY

A method, system, and/or computer program product alters a functional characteristic of a computer used by an invitee to a new meeting. A request to create a new meeting invitation for a new meeting to an invitee is received. Content from a previous meeting to which the invitee was invited is retrieved, where the first content includes a similar subject as the subject of the new meeting and whether the invitee attended the previous meeting. Based on this content, a date, time, and duration of the new meeting is determined, and a new meeting invitation is transmitted to an invitee's computer used by the invitee. A server receives a response to the new meeting invitation and a status of the invitee, and initiates an alteration of a functional characteristic of the invitee's computer based on the response from the invitee and the status of the invitee.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
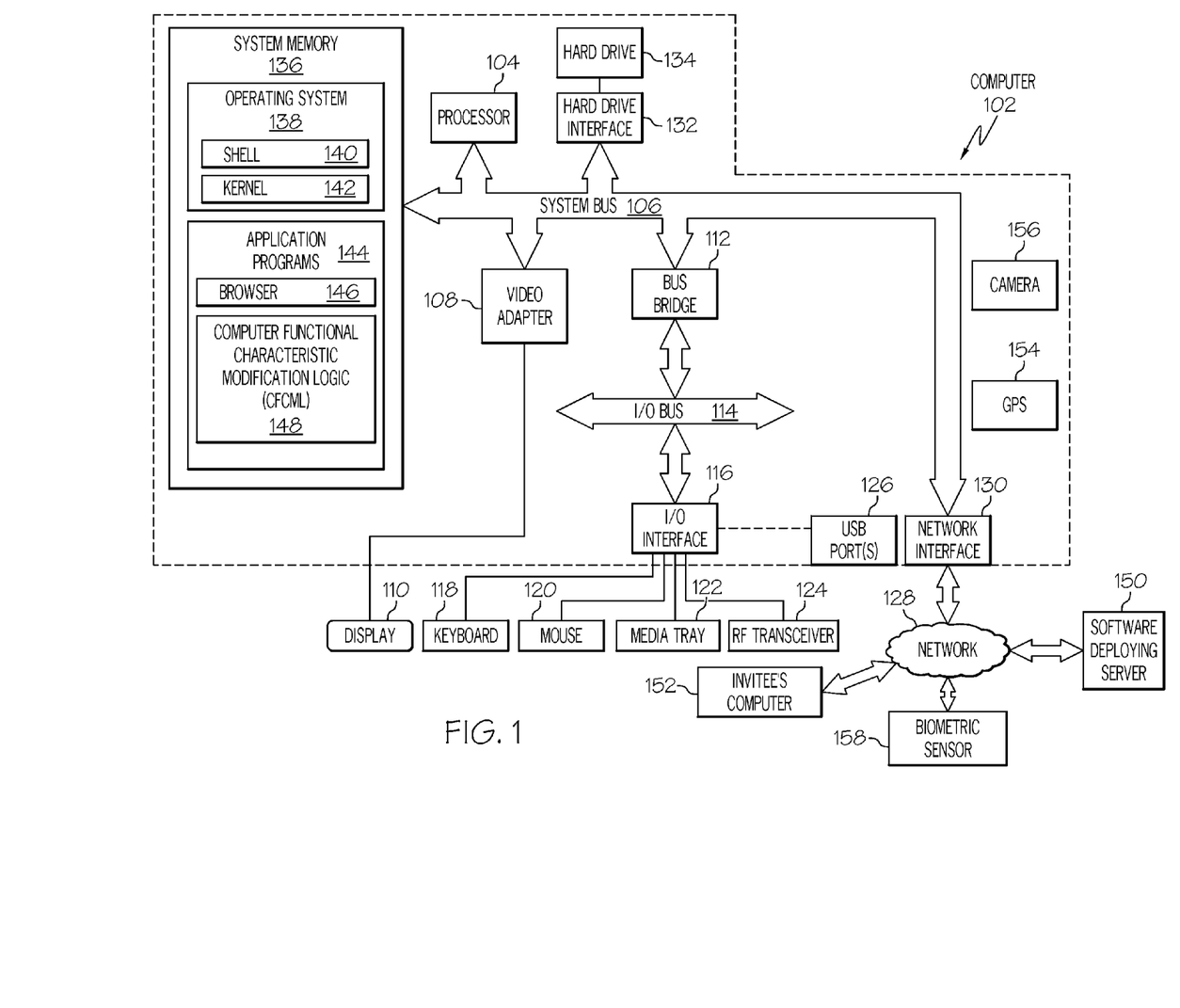
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150 and/or invitee's computer 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a radio frequency (RF) transceiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, and/or invitee's computer 152 using a network interface 130. Network interface 130 is a hardware network interface, such as a network interface card (NIC), etc. Network 128 may be an external network such as the Internet, or an internal network such as an Ethernet or a virtual private network (VPN). In one or more embodiments, network 128 is a wireless network, such as a Wi-Fi network.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a computer functional characteristic modification logic (CFCML) 148. CFCML 148 includes code for implementing the processes described below, including those described in FIGS. 2-3. In one embodiment, computer 102 is able to download CFCML 148 from software deploying server 150, including in an on-demand basis, wherein the code in CFCML 148 is not downloaded until needed for execution. In one embodiment of the present invention, software deploying server 150 performs all of the functions associated with the present invention (including execution of CFCML 148), thus freeing computer 102 from having to use its own internal computing resources to execute CFCML 148.

Also within computer 102 is a camera 156, which is capable of capturing still photos or moving video, preferably in a digital format such as a joint photographic experts group (JPEG) format or a moving picture experts group (MPEP) format.

In accordance with one or more embodiments of the present invention, also within computer 102 is at least one biometric sensor 158. Examples of biometric sensor 158 include, but are not limited to, a blood pressure/pulse monitor (e.g., a pressure/sound sensor that detects the pulse and/or blood pressure of the holder of an electronic device such as a smart phone), a skin sensor (e.g., a resistance sensor that measures a galvanic skin response from the user/holder sweating while holding an electronic device such as a smart phone), pupil dilation detector (e.g., used with camera 156 to capture an image of the user/holder's eye pupils to indicate various emotions that are known to be associated with pupil dilation and/or pupil contraction), a microphone (e.g., to detect a breathing pattern of the holder of an electronic device such as a smart phone), etc. Thus, biometric sensor 158 is an electronic device for gathering biometric data associated with a human. Biometric data is data describing a physiological state, physical attribute, or measurement of a physiological condition of a person.

In one or more embodiments of the present invention, computer 102 may include a positioning system, such as the depicted global positioning system (GPS) 154, which is a space-based satellite navigation system that provides location information for a GPS-enabled device, such as a smart phone. In another embodiment, the positioning system is a positioning system that utilizes signals from local transmitters. These local signals are triangulated to determine the real-time position/location of computer 102.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

As described herein, the present invention provides a new and useful method, system, and/or computer program product for managing resources based on how identified attendees to a meeting respond to an invitation to the meeting.

As described herein, historical records of meeting invitations sent within an enterprise are analyzed and stored in a repository. Natural Language Processing (NLP) deep parsing is then used to analyze the meeting name and any attached meeting notes to determine the topic of each meeting (such as "funding call related to Product A" or "resolution of defect 1 in Product X").

The system records the people invited to the meeting, and their responses (accept, decline, reschedule, delegate and so forth). The system also records the date and time of the meeting, and the meeting duration.

A user of calendar software then specifies a topic for a new meeting from which an analysis is performed. The system analyzes the historical data collected in the repository to determine the most relevant people to invite to the meeting. The system analyzes previous meetings on this topic, looks at the frequency of who was invited, and whether they accepted the meeting invitation. If a particular person is determined to often attend meetings on the topic, the system provides a weighted recommendation as to whether that particular person should be invited to this new meeting.

When the system determines which people to invite to the new meeting, calendar software recommends the best time slot to schedule the meeting and the best duration for the meeting to maximize the chances that invitees will attend. The system collects unallocated (free) time on each invitee's calendar and analyzes the historical data collected in the repository.

The system further analyzes past acceptances and declines of other meetings on this same topic at a similar date and time and provides a weighted recommendation for the best free time slot to maximize acceptance from all invitees. The system uses a similar analysis to determine historically which meeting duration is most likely to be accepted.

The system then records its weighted recommendations, and the results of the recommendations (how many of the recommended attendees did accept the meeting at the recommended time and duration). These results are used for self-learning, thus improving the algorithm over time.

Thus, the present invention uses historical calendar data to create a repository of past meeting topics, attendees, and acceptance rates using NLP deep parsing in order to make predictive weighted recommendations on who should attend a meeting on a given topic.

Thus, the system (e.g., computer 102 shown in FIG. 1) analyzes an enterprise-wide archive of calendar invitations to extract metadata regarding past meetings. The information contained within each calendar invitation includes the: Meeting subject title; Meeting description; Meeting date, time, and duration; Invitees; and Invitee status (accept, rejected, delegated, and so forth).

Natural Language Processing (NLP) deep parsing is used to analyze the text in the meeting subject, title, and meeting description to determine the purpose of the previous meeting and keywords related to the previous meeting. For example, NLP deep parsing will determine if the primary purpose of the meeting is technical support problem determination, an opportunity for new funding, and so forth. Relevant keywords related to the purpose of the meeting are also extracted (the technology requiring technical support, the project seeking funding, and so forth). This, combined with information about the meeting date, time, duration, invitees, and invitee status is stored in a repository. In one or more embodiments of the present invention, this analysis is performed enterprise-wide for all archived calendar invitations on record, and continues to operate as new calendar invitations are created across an enterprise. The result is an ever-growing repository of parsed calendar data.

Figure 2:
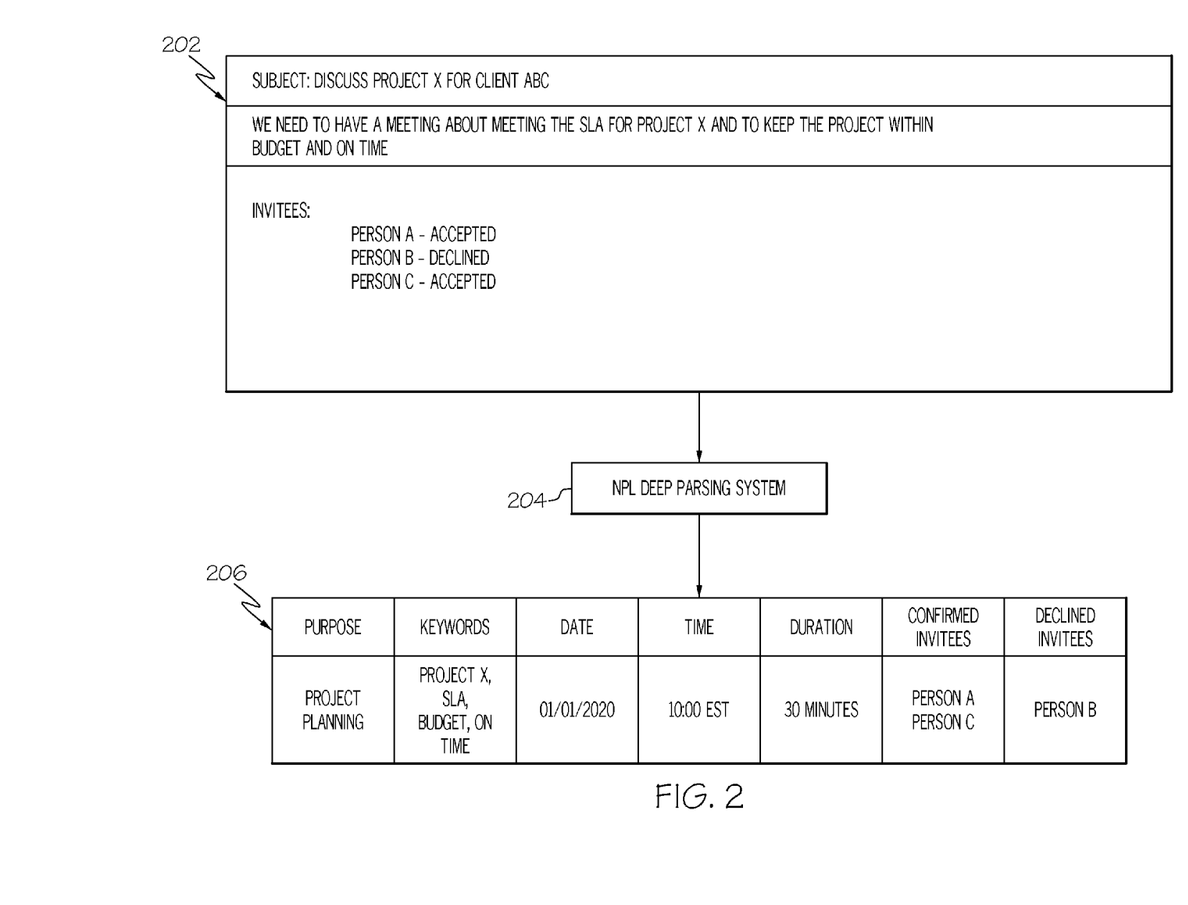
FIG. 2 illustrates content being analyzed by a deep parsing system to extract key information about a prior meeting.

For example, consider the previous meeting described in an entry 202 shown in FIG. 2. Entry 202 may be a calendar entry, an e-mail, an electronic invitation, etc. As shown, entry 202 is for a meeting in regard to "Project X" for "Client ABC". More specifically, the meeting is in regard to meeting the Service Level Agreement (SLA) for the project, including keeping it on budget and on time. Persons A, B, and C have been invited to the meeting, but only Persons A and C accepted the invitation.

A Natural Language Processing (NLP) deep parsing system 204 uses deep linguistic processing to determine content, subject matter, and context of a text document by using rules that match human language to emulate human reading and comprehension processing. Thus, NLP deep parsing system 204 extracts/determines the purpose, keywords, date, time, duration, confirmed invitees, and declined invitees of the prior meeting, as shown in table 206.

A system then creates a new meeting invitation for the same topic as the prior meeting described in FIG. 2. The system provides the user with predictive weighted recommendations on who to invite, and the optimum time and duration to schedule the meeting.

The system creates a meeting invitation with a meeting subject and optionally a meeting description.

The system may also optionally add invitees to the meeting.

The system then analyzes the enterprise-wide calendar repository to look for previous meetings that share a similar purpose and keywords, and makes weighted recommendations on relevant people to invite to the meeting.

Selection criteria include:
Frequency—the number of times a person has been invited to similar meetings, indicating this meeting topic will be relevant to them;
Recognized expert—through analyzing attendance to meetings on a particular technology, it can be determined that a person is a recognized expert in this area;
Decision maker—through analyzing attendance to meetings it can be determined a person is involved as a decision maker in approvals (such as approving funding); and/or
Relation to other invitees—if one or more individuals are invited to a meeting, historically this other person is frequently also invited.

Exemplary details of how a person is deemed to be a recognized expert, decision maker, and/or related to other invitees are as follows.

Recognized expert. Assume that a series of meetings during a past predetermined time period (e.g., the past three months) have all been directed to "Topic A". The attendance records reveal details such as 1) who attended the meetings, 2) who called the meetings, 3) whose presence has been labeled as "essential" in the invitations to the meetings, 4) the roles of the attendees to the meetings, etc. Thus, if a particular person has been assigned the role of presenting technical details on "Topic A" at most if not all of the meetings, then a conclusion is reached that this person is a recognized expert on "Topic A".

Decision maker. Assume now that a series of meetings during a past predefined time period have been directed to the decision of whether or not to proceed with and/or fund "Project A". Assume further that a particular person has attended all of these meetings, has called the meeting, has been labeled as an essential attendee to the meeting, and/or has a role/title of being responsible for approving/funding projects related to "Project A". If so, then a conclusion is reached that this person is the "decision maker" for "Project A".

Relation to other invitees. Assume that a series of meetings regarding a same topic, project, etc., or even a series of meetings related to disparate topics, projects, etc., have transpired during a predefined past period of time. An analysis of these past meetings reveals that whenever "Person A" attends a meeting, "Person B" also attends that same meeting. However, if "Person A" does not attend a meeting to which he/she is invited, then "Person B" likewise does not attend that meeting, even though "Person B" was invited. A conclusion is reached that "Person A" and "Person B" have an intertwined relationship (e.g., work on a same project), such that if an invitation to a meeting goes out to "Person A", an invitation to "Person B" should also be extended.

The system presents the user with a list of recommended individuals to invite to the meeting based on this analysis combined with confidence levels. This confidence level may be based on any type of statistical analysis, including but not limited to a Bayesian analysis. For example, For example, assume that a confidence level of whether or not a person is a recognized expert uses the following exemplary Bayesian probability formula:

$$P(A|B) = \frac{P(B|A)P(A)}{P(B)}$$

where:
P(A|B) is the probability that a particular person is an expert in "Topic A" (A) given that (I) he/she was invited to all meetings related to "Topic A" over the past three months (B);
P(B|A) is the probability that this person was invited to all meetings related to "Topic A" over the past three months (B) given that (I) this particular person is an expert in "Topic A" (A);
P(A) is the probability that this person is an expert in "Topic A" regardless of any other information; and
P(B) is the probability that this person was invited to all meetings related to "Topic A" over the past three months regardless of any other information.

For example, assume that 10% of all employees of an enterprise are invited to meetings related to "Topic A", thus making P(B)=0.10. Assume further that 5% of all enterprise employees are experts in "Topic A", thus placing P(A) at 0.05. Furthermore, historical data shows that experts in "Topic A" are invited to meetings related to "Topic A" 80% of the time, such that P(B|A) is =0.80. Based on these probabilities, then the probability P(A|B) that a particular person is an expert in "Topic A" (A) given that (I) he/she was invited to all meetings related to "Topic A" over the past three months (B) is 40%:

$$P(A|B) = \frac{.80 * .05}{.10} = .40$$

If 40% exceeds some predetermined value (e.g., 25%), then the system is confident that this particular person is a subject matter expert in "Topic A".

In addition to presenting the user with names, the reason behind their selection is also displayed. For example, exemplary recommended invitees and the reason for inviting them may be (based on statistical confidence levels as described above):
"Recommended invitees:
Joe Smith (65% confidence level), Jane Johnson (73% confidence level).
Reasoning:
48% of meetings associated with defect X in product A have been attended by Joe Smith in the last 3 months. The scope of these meetings indicate Joe is an expert in this technology
64% of meetings requesting project funding for focus area B have been attended by Jane Johnson in the last 2 years."

The system then uses metadata stored in the enterprise-wide calendar repository to determine the best date, time, and duration to schedule the meeting with the recommended invitees. Selection criteria include:
Unallocated time—time marked as "free time" on each person's calendar;
Past acceptance history—which times of day and week does a person typically accept or reject meeting invitations;
Duration—does a person favor meetings of a certain time? (for example, 85% of meeting invitations with a duration of 90 minutes or more are rejected);

Topic—does the topic of the meeting affect the likelihood they will join?; and/or Invitee status—to what extent does being invited as "required" or "optional" affect the likelihood they will join.

The analysis for each individual is combined to form a predictive weighted recommendation for when to schedule the meeting and for how long. For example:

"Recommended meeting schedule: Wednesday at 10 am for 30 minutes (89% confidence level)

Reasoning:

Joe Smith accepts 85% of meetings scheduled for 30 minutes or less on weekday mornings Jane Johnson accepts 95% of meetings related to focus area B product funding scheduled for Mon-Thurs."

The system monitors the actual performance of its predictive weighted recommendations over time. By analyzing a set of weighted recommendations it can improve confidence level predictions and look for further patterns to better improve weighted recommendations.

Figure 3:
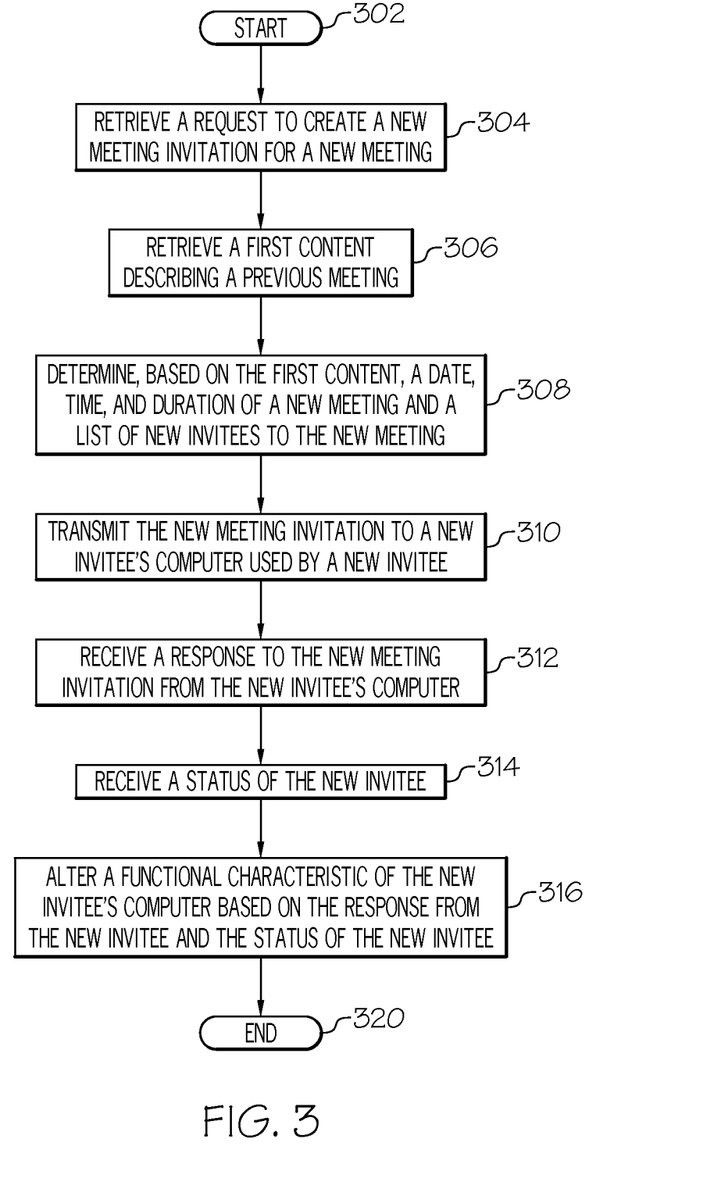
FIG. 3 is a high-level flow chart of one or more steps performed by a processor to alter a functional characteristic of a computer used by an invitee to a new meeting.

With reference now to FIG. 3, a high-level flow-chart of one or more steps performed by one or more processors to alter a functional characteristic of a computer used by an invitee to a new meeting is presented.

After initiator block 302, one or more processors receive a request to create a new meeting invitation for a new meeting, as described in block 304. The request includes a subject of the new meeting.

As described in block 306, one or more processors retrieve a first content from a previous meeting. The first content includes a same subject as the subject of the new meeting, and the first content includes a list of previous invitees who attended the previous meeting.

As described in block 308, based on the first content, one or more processors determine a date, time, and duration of the new meeting, as well as a list of invitees (taken from the list of previous invitees) to be invited to the new meeting.

As described in block 310, one or more processors transmit the new meeting invitation to an invitee's computer used by an invitee taken from the list of new invitees.

As described in block 312, one or more processors then receive a response to the new meeting invitation from the new invitee's computer, indicating whether or not the new invitee will attend the new meeting.

As described in block 314, one or more processors also receive a status of the new invitee. The status of the new invitee describes a present circumstance and/or environment of the new invitee.

As described in block 316, one or more processors then alter (or at least initiate an alteration of) a functional characteristic of the new invitee's computer based on the response from the new invitee and the status of the new invitee.

The flow-chart ends at terminator block 320.

The present invention may be implemented using processors within a user's computer, a server to the user's computer, a third party computer, etc.

In one embodiment of the present invention, the method further comprises altering, by one or more processors, a functional characteristic of the new invitee's computer based on the response of the new invitee and the status of the new invitee by altering characteristics of functions described in one or more of the layers described in the seven-layer open systems interconnection (OSI) model.

As known to those skilled in the art of computer operations and architecture, the internal functions of a communication system in a computer system is described in the OSI model, which is a functionality model that partitions various components of the communication system IT into abstraction layers. The OSI model groups communication functions into seven logical layers. Each layer serves the layer above it and is served by the layer below it. The seven layers in the OSI model are defined as follows:

Layer 1—Physical Layer

The physical layer describes the fundamental features of how messages are transmitted and received as raw bit streams over a physical medium. Functions and services performed by the physical layer include bit delivery, an interface to a physical transmission media (e.g., electrical connectors), modulation, bit synchronization, multiplexing, error correction, channel coding, duplex setup, network topology, etc.

Layer 2—Data Link Layer

The data link layer is the protocol layer that describes the transfer of data between nodes in a wide area network or a local area network segment. The data link layer provides the functional and procedural means to transfer messages between network entities and might provide the means to detect and possibly correct errors that may occur in the physical layer.

Layer 3—Network Layer

The network layer is responsible for packet forwarding, such as routing messages (i.e., packets) including routing through intermediate routers. That is, the data link layer is responsible for media access control, flow control and error checking, while the network layer is responsible for structuring and managing multi-node networks themselves, including addressing, routing, and traffic control throughout the networks.

Layer 4—Transport Layer

The transport layer provides transmission of data segments between points on a network using flow control and multiplexing. That is, the transport layer manages segmentation, acknowledgement, and multiplexing of messages using Transmission Control Protocol (TCP), User Datagram Protocol (UDP), Datagram Congestion Control Protocol (DCCP), and/or Stream Control Transmission Protocol (SCTP).

Layer 5—Session Layer

The session layer provides the mechanism for opening, closing and managing a session between end-user application processes. That is, communication sessions include requests and responses that occur between applications, thus enabling synchronization points in a stream of exchanged messages in either full-duplex or half-duplex mode. Thus, the session layer responds to service requests from the presentation layer and issues service requests to the transport layer.

Layer 6—Presentation Layer

The presentation layer, also called the syntax layer, is responsible for the delivery and formatting of information to the application layer for further processing or display. That is, if a message is in a first protocol (e.g., is an EBCDIC-coded text computer file), the presentation/syntax layer can convert it into another protocol, such as ASCII. Thus, the presentation layer translates data between a networking service and an application, providing services such as character encoding, data compression, encryption/decryption, etc.

Layer 7—Application Layer

The application layer specifies the shared protocols and interface methods used by hosts in a communications network. Thus, the application layer provides high-level application program interfaces (APIs), which enable resource sharing, remote file access, directory services, virtual machines, etc.

Thus, in one embodiment of the present invention, one or more processors alter the functional characteristic of the new invitee's computer based on the response of the new invitee and the status of the new invitee by increasing a transmission bit rate described in a physical layer in a seven-layer open systems interconnection (OSI) model. That is, the physical layer of the OSI model defines the bit rate used in message transmissions, which is the number of bits of data that are transmitted per unit of time (typically some multiple of bits per second, such as Kbit/s, Mbit/s, Gbit/s, etc.). If the invitee accepts or declines the invitation to the new meeting, the bit rate will be changed. For example, assume that the new invitee declined the invitation to the new meeting, which is related to a new computer network. In one embodiment of the present invention, this results in the bit rate being slowed down, since the invitee will not be trained on features of the new computer network, and thus is blocked from using high-speed bit rates. Conversely, if the new invitee accepts the invitation to the new meeting, then this results in the bit rate being sped up, since the new invitee will be trained in the features of the new computer network, and thus can properly utilize the new features (e.g., faster speed) of the new computer network.

In one embodiment of the present invention, one or more processors alter the functional characteristic of the new invitee's computer based on the response of the new invitee and the status of the new invitee by modifying a data frame described in a data link layer in a seven-layer open systems interconnection (OSI) model, where modifying the data frame selectively alters the functional characteristic of the new invitee's computer by forcing transmission of a message to a resource used by the new invitee's computer that changes a functionality of the new invitee's computer. That is, the basic structure of messages is established in the data link layer.

For example, assume that the new meeting is related to upgraded resources in a network that is used by the new invitee's computer. If the new invitee accepts the invitation to the new meeting, then the data link layer will redirect any message to older resources in the network to the upgraded new resources in the network, thus adjusting (e.g., improving) the functionality of the new invitee's computer, which is now able to use the upgraded resources from the network.

In one embodiment of the present invention, one or more processors alter the functional characteristic of the new invitee's computer based on the response of the new invitee and the status of the new invitee by adjusting a format of a datagram described in a network layer in a seven-layer open systems interconnection (OSI) model. The datagram is sent from a managing computer (e.g., the user's computer) to the new invitee's computer, the datagram describes the new meeting invitation, and adjusting the format of the datagram newly requires the new invitee's computer to acknowledge receipt of the datagram, where no receipt was required prior to adjusting the format of the datagram. All of these changes are dependent upon the new invitee accepting the invitation to the new meeting.

In one embodiment of the present invention, one or more processors alter the functional characteristic of the new invitee's computer based on the response of the new invitee by opening a session between a first computer (e.g., the user's computer) and the new invitee's computer as described in a session layer in a seven-layer open systems interconnection (OSI) model. Thus, change (opening the session) enables the new invitee's computer to receive the new meeting invitation, thus altering the functionality of the new invitee's computer. These changes are dependent upon the new invitee accepting the invitation to the new meeting.

In one embodiment of the present invention, the functional characteristic of the new invitee's computer is altered by one or more processors based on the response of the new invitee, such that resources within the new invitee's computer are selectively disabled or by enabling previously disabled resources within the new invitee's computer. For example, assume that the new invitee accepted the invitation to the new meeting, which related to training on operation of certain software and/or hardware features of the new invitee's computer. The system will then enable features in the new invitee's computer that were the subject of the new meeting. However, if the new invitee declined to participate in the new meeting, then such resources are disabled, since the new invitee has not receive the requisite training being provided by the new meeting.

Similarly, resources within the invitee's computer may be modified, based on whether or not the new invitee accepts the invitation to the new meeting. For example, assume that the new meeting is with regard to new features that have been enabled in the new invitee's computer's CPU. If the invitee participates in the new meeting, then these new features (e.g., faster input/output ports) will be turned on, thus modifying the CPU itself.

In one embodiment of the present invention, one or more processors (e.g., processor 104 within computer 102 in FIG. 1) receive a biometric reading from a biometric sensor (e.g., biometric sensor 158 shown in FIG. 1, assuming that biometric sensor is associated with the invitee's computer 152). The biometric reading describes a biometric feature of the new invitee. Based on this biometric reading for the new invitee, one or more processors define the status of the new invitee, which is used to adjust the functionality of the new invitee's computer. For example, if the biometric reading indicates that the new invitee is currently asleep, and thus did not accept the invitation to the new meeting, then an alarm may sound in the new invitee's computer, waking him up for the meeting that has just been scheduled for the present time.

In one embodiment of the present invention, one or more processors receive a positioning reading from a geophysical location sensor (e.g., GPS 154 shown in FIG. 1). The positioning reading describes a real-time location of the new invitee (assuming that GPS 154 is part of the invitee's computer 152). Based on this real-location of the new invitee, one or more processors in a computer such as a user's computer (e.g., computer 102 in FIG. 1) define the status of the new invitee, which is used to adjust the functionality of the new invitee's computer. For example, if the GPS 154 determines that the new invitee is at a location that does not support high-speed Internet access needed to attend the new meeting, then a radio transceiver (e.g., RF transceiver 124 shown in FIG. 1) within the new invitee's computer will be enabled to access a cell-based Internet Service Provider (ISP).

In one embodiment of the present invention, one or more processors determine participants of the new meeting invitation based on a first content. That is, if prior meetings were related to the same topic as the new meeting, then those who were invited to and attended the previous meetings will selectively be invited to the new meeting, since they are apparently interested in this topic. Alternatively, those who attended the previous meetings may not be invited to the new meeting, since they have already heard the information in the new meeting from the previous meetings.

In one embodiment of the present invention, one or more processors generate a confidence level of whether the determined date, time, and duration of the new meeting invitation are appropriate, as described above.

In one embodiment of the present invention, one or more processors generate a confidence level of whether the new invitee should be invited to the new meeting, as described above.

In one or more embodiments of the present invention, one or more processors predict times during which it is most likely for one or more attendees to attend a meeting. In one embodiment of the present invention, this information is derived from simply asking the attendees for the data/time that works best for them, or by checking their future calendar. In another embodiment, however, this "best time" is determined using a statistical analysis of past met appointments. For example, if Attendee A historically has attended all meetings to which he/she has been invited that are in the afternoon, but has rarely or never attended a meeting to which he/she has been invited that was in the morning, then a probability analysis (e.g., using a Bayesian analysis) will determine that this person should be invited to an afternoon meeting, not a morning meeting.

In one or more embodiments of the present invention, once a probability of the user attending the meeting to which he/she was invited is established, this probability is displayed on a meeting invitation user interface. For example, based on the user's interest in the meeting, past history of attending meetings related to this topic, etc., a statistical analysis performed by one or more processors determines the likelihood (percentage) that this person will attend the meeting. The determined percentage/likelihood is displayed next to the name of all invitees on the meeting host's user interface. That is, the meeting host's user interface will show not only the topic, time/date, and invitees to the meeting, but will also show the likelihood (e.g., 75% likelihood of attending) for each of the invitees.

Once the likelihood of particular attendees is established, the title of the meeting may be tweaked. For example, assume that the title/subject of the meeting is "Status of the product tables". Invitations are sent to multiple invitees. A statistical analysis reveals that the likelihood that one, some, or all of the invitees will attend is less than 50%. However, by retitling the name/subject of the meeting (either for the current meeting or for future meetings) to "Detailed analysis of the product tables", a new statistical analysis may reveal that the likelihood that one, some, or all of the invitees will attend is now more than 90%. This information is then incorporated by the system to automatically re-name future meetings related to the topic of product tables and their status/features.

One or more embodiments of the present invention may be implemented in a cloud environment. However, it is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
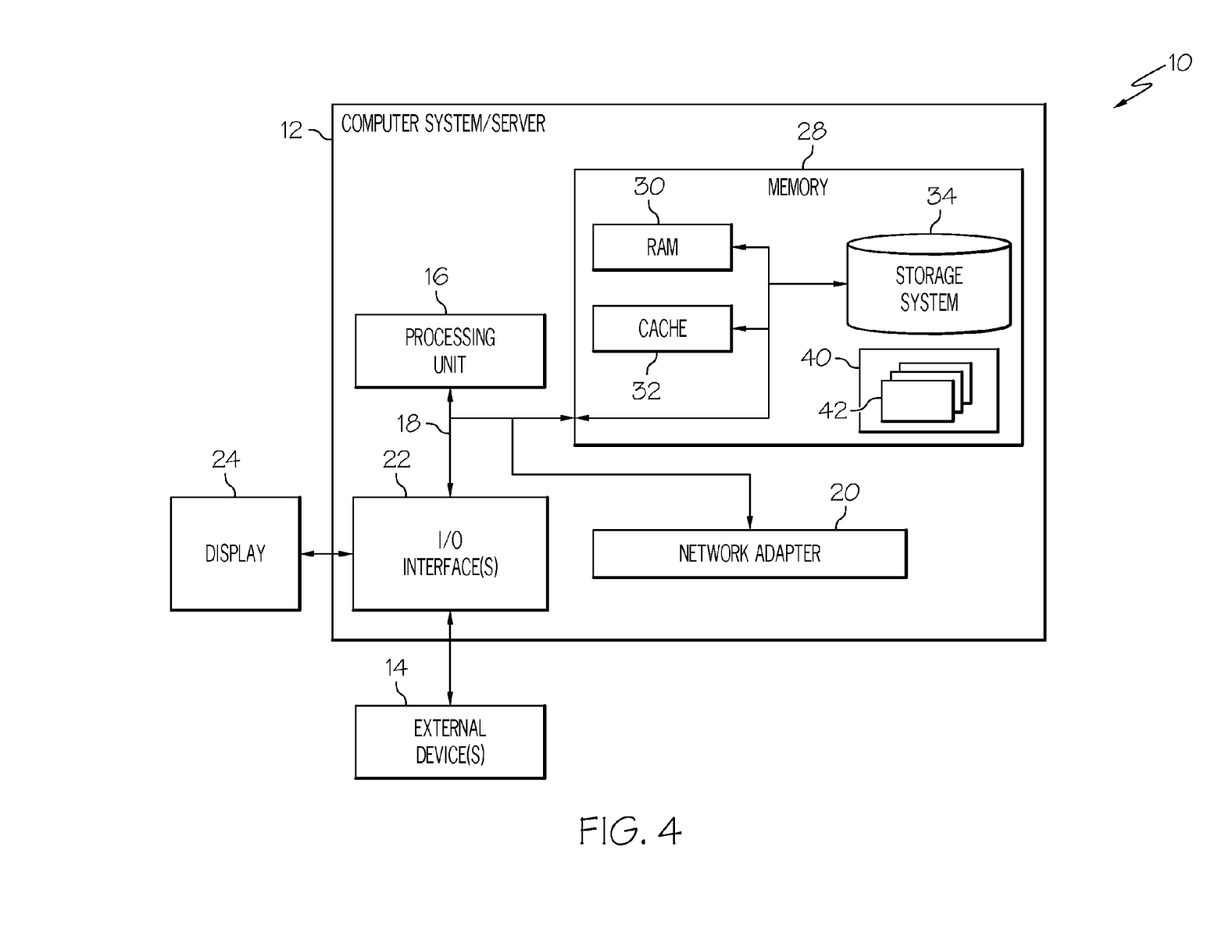
FIG. 4 depicts a cloud computing node according to an embodiment of the present disclosure.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
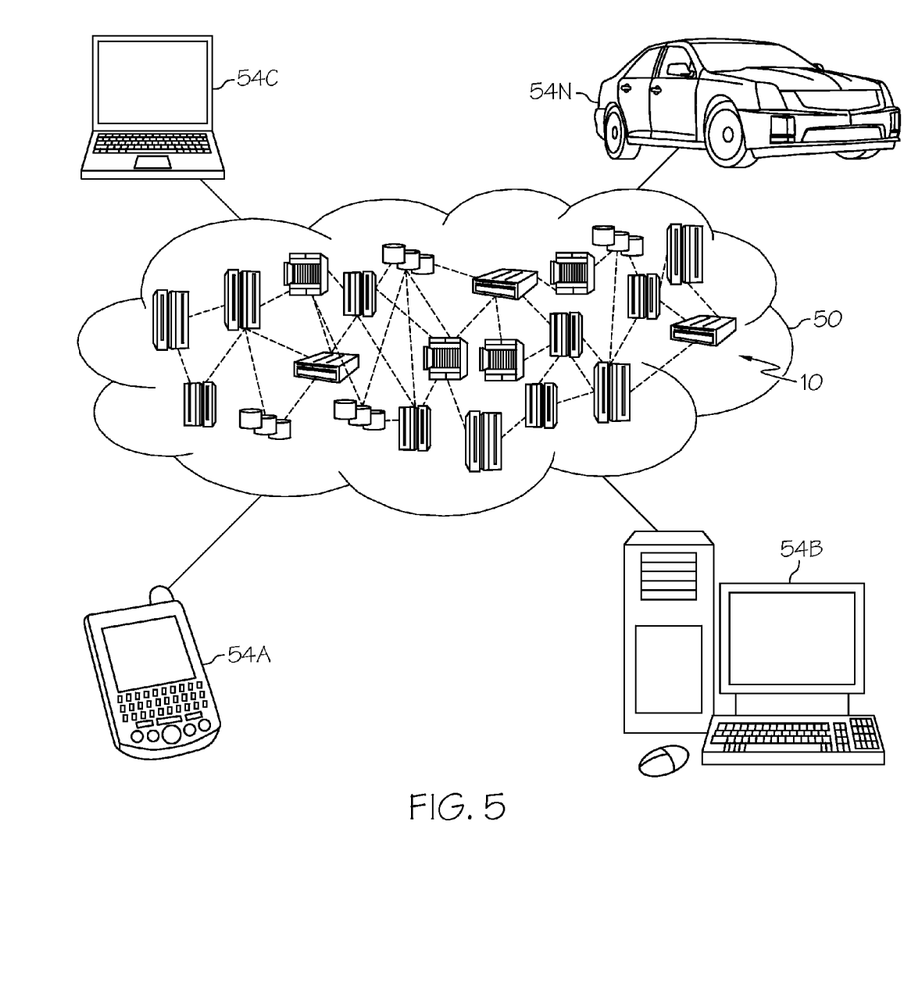
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 5 are intended to be illustrative only and that computing nodes 10 and cloud computing environment 50 can communicate with any type of computerized device over any type of network and/or network addressable connection (e.g., using a web browser).

Figure 6:
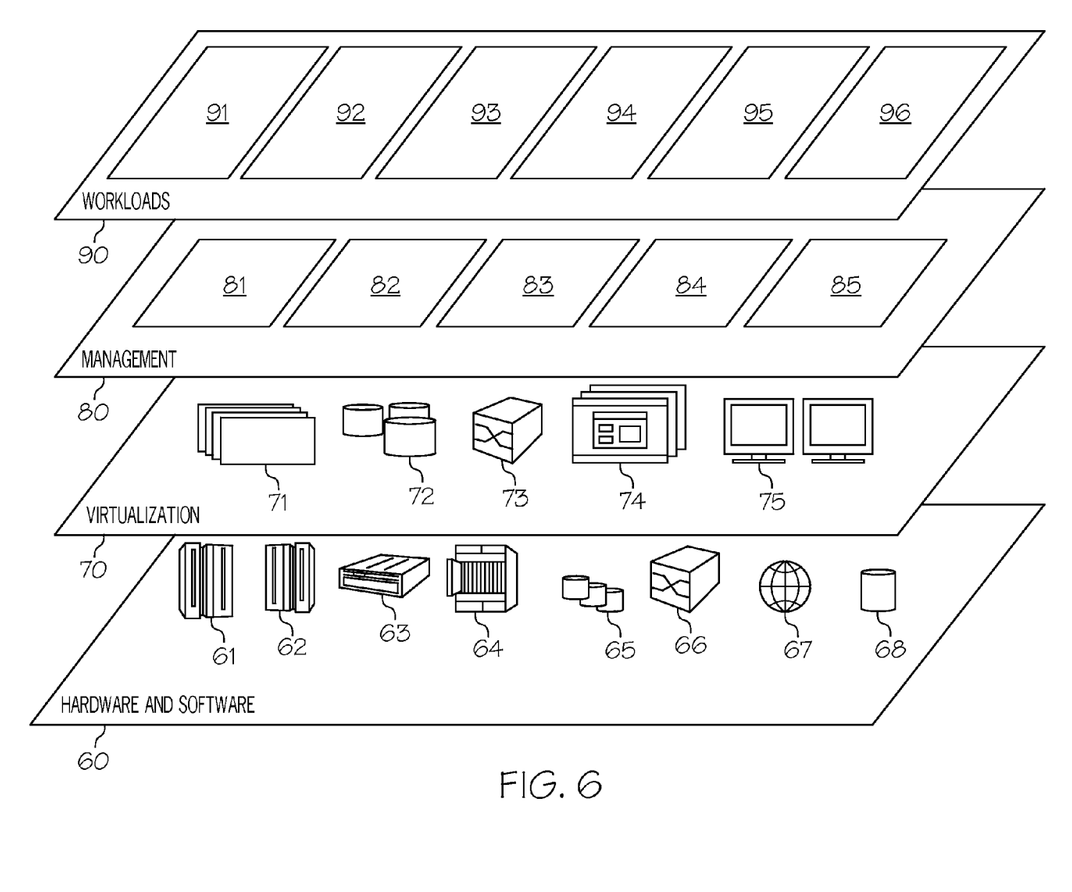
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and invitation-based computer characteristic alteration processing 96 (for altering a functional characteristic of a computer used by an invitee to a new meeting as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method of altering a functional characteristic of a computer used by an invitee to a new meeting, the method comprising:

receiving, by a managing computer, a request to create a new meeting invitation to a new meeting, wherein the request includes a subject of the new meeting, and wherein the subject of the new meeting is one or more new computer features;

retrieving, by the managing computer, a first content from a previous meeting, wherein the first content includes a same subject as the subject of the new meeting, and wherein the first content includes a list of previous invitees who attended the previous meeting;

determining, by the managing computer and based on the first content, a date, time, and duration of the new meeting and a list of new invitees to be invited to the new meeting, wherein the list of new invitees is taken from the list of previous invitees;

transmitting, by the managing computer, the new meeting invitation to a new invitee's computer used by a new invitee from the list of new invitees;

receiving, by the managing computer, a response to the new meeting invitation from the new invitee's computer, wherein the response indicates whether or not the new invitee will attend the new meeting;

receiving, by the managing computer, a status of the new invitee regarding attending the new meeting; and altering, by the managing computer, a functional characteristic of the new invitee's computer by adjusting a payload of a datagram, the adjusting based on the response from the new invitee, the status of the new invitee, and the one or more new computer features, and transmitting the datagram from the managing computer to the new invitee's computer, wherein acknowledging receipt of the datagram by the new invitee's computer initiates a deployment of the payload which adjusts a transmission bit rate of a hardware network interface used by the new invitee's computer as described in a physical layer in a seven-layer open systems interconnection (OSI) model.

2. The method of claim 1, further comprising:

further altering, by the managing computer, the functional characteristic of the new invitee's computer based on the response of the new invitee and the status of the new invitee by modifying a data frame described in a data link layer in the seven-layer OSI model, wherein modifying the data frame selectively alters the functional characteristic of the new invitee's computer by forcing transmission of a message to a resource used by the new invitee's computer that changes a functionality of the invitee's computer.

3. The method of claim 1, further comprising:

further altering, by the managing computer, the functional characteristic of the new invitee's computer based on the response of the new invitee and the status of the new invitee by adjusting a format of the datagram, wherein the datagram describes the new meeting invitation, wherein adjusting the format of the datagram newly requires the new invitee's computer to acknowledge receipt of the datagram.

4. The method of claim 1, further comprising:

further altering, by the managing computer, the functional characteristic of the new invitee's computer based on the response of the new invitee and the status of the new invitee by opening a session between the managing computer and the new invitee's computer as described in the session layer in the seven-layer OSI model.

5. The method of claim 1, further comprising:

further altering, by the managing computer, the functional characteristic of the new invitee's computer based on the response of the new invitee and the status of the new invitee by disabling resources within the new invitee's computer.

6. The method of claim 1, further comprising:

further altering, by the managing computer, the functional characteristic of the new invitee's computer based on the response of the new invitee by enabling previously disabled resources within the new invitee's computer.

7. The method of claim 1, further comprising:

further altering, by the managing computer, the functional characteristic of the new invitee's computer based on the response of the new invitee and the status of the new invitee by modifying resources within the new invitee's computer.

8. The method of claim 1, further comprising:

receiving, by the managing computer, a biometric reading from a biometric sensor, wherein the biometric reading describes a biometric feature of the new invitee; and defining, by the managing computer, the status of the new invitee based on the biometric reading for the new invitee.

9. The method of claim 1, further comprising:

receiving, by the managing computer, a positioning reading from a geophysical location sensor, wherein the positioning reading describes a real-time location of the new invitee; and defining, by the managing computer, the status of the new invitee based on the real-time location of the new invitee.

10. The method of claim 1, wherein the first content identifies all attendees of the previous meeting, and wherein the method further comprises:

determining, by the managing computer, all participants of the new meeting invitation based on the first content.

11. The method of claim 1, further comprising:

generating, by the managing computer, a confidence level of whether the determined date, time, and duration of the new meeting invitation are appropriate.

12. The method of claim 1, further comprising:

generating, by the managing computer, a confidence level of whether the new invitee should be invited to the new meeting.

13. The method of claim 1, wherein the first content includes whether the new invitee was invited to previous meetings that addressed the same subject as the new meeting, whether the new invitee has been predetermined to be a recognized expert in the subject of the new meeting, and whether the new invitee has been predetermined to be a decision maker of the subject.

14. A computer program product for altering a functional characteristic of a computer used by an invitee to a new meeting, the computer program product comprising a non-transitory computer readable storage medium having program code embodied therewith, the program code readable and executable by a managing computer to perform a method comprising:

receiving a request to create a new meeting invitation to a new meeting, wherein the request includes a subject of the new meeting, and wherein the subject of the new meeting is one or more new computer features;

retrieving a first content from a previous meeting, wherein the first content includes a same subject as the subject of the new meeting, and wherein the first content includes a list of previous invitees who attended the previous meeting;

determining, based on the first content, a date, time, and duration of the new meeting and a list of new invitees to be invited to the new meeting, wherein the list of new invitees is taken from the list of previous invitees;

transmitting the new meeting invitation to a new invitee's computer used by a new invitee from the list of new invitees;

receiving a response to the new meeting invitation from the new invitee's computer, wherein the response indicates whether or not the new invitee will attend the new meeting;

receiving a status of the new invitee regarding attending the new meeting;

altering a functional characteristic of the new invitee's computer by adjusting a payload of a datagram, the adjusting based on the response from the new invitee the status of the new invitee, and the one or more new computer features, and transmitting the datagram from the managing computer to the new invitee's computer, wherein acknowledging receipt of the datagram by the new invitee's computer initiates a deployment of the payload which adjusts a transmission bit rate of a hardware network interface used by the new invitee's computer as described in a physical layer in a seven-layer open systems interconnection (OSI) model.

15. The computer program product of claim 14, wherein the method further comprises:
   receiving a biometric reading from a biometric sensor, wherein the biometric reading describes a biometric feature of the new invitee; and
   defining the status of the new invitee based on the biometric reading for the new invitee.

16. The computer program product of claim 14, wherein the method further comprises:
   receiving a positioning reading from a geophysical location sensor, wherein the positioning reading describes a real-time location of the new invitee; and
   defining the status of the new invitee based on the real-time location of the new invitee.

17. A computer system comprising:
   a processor, a computer readable memory, and a non-transitory computer readable storage medium;
   first program instructions to receive a request to create a new meeting invitation to a new meeting, wherein the request includes a subject of the new meeting, and wherein the subject of the new meeting is one or more new computer features;
   second program instructions to retrieve a first content from a previous meeting, wherein the first content includes a same subject as the subject of the new meeting, and wherein the first content includes a list of previous invitees who attended the previous meeting;
   third program instructions to determine, based on the first content, a date, time, and duration of the new meeting and a list of new invitees to be invited to the new meeting, wherein the list of new invitees is taken from the list of previous invitees;
   fourth program instructions to transmit the new meeting invitation to a new invitee's computer used by a new invitee from the list of new invitees;
   fifth program instructions to receive a response to the new meeting invitation from the new invitee's computer, wherein the response indicates whether or not the new invitee will attend the new meeting;
   sixth program instructions to receive a status of the new invitee regarding attending the new meeting; and
   seventh program instructions to alter a functional characteristic of the new invitee's computer by adjusting a payload of a datagram, the adjusting based on the response from the new invitee, the status of the new invitee, and the one or more new computer features, and to transmit the datagram from the managing computer to the new invitee's computer, wherein acknowledging receipt of the datagram by the new invitee's computer initiates a deployment of the payload which adjusts a transmission bit rate of a hardware network interface used by the new invitee's computer as described in a physical layer in a seven-layer open systems interconnection (OSI) model; and wherein
   the first, second, third, fourth, fifth, sixth, and seventh program instructions are stored on the non-transitory computer readable storage medium for execution by one or more processors via the computer readable memory.

18. The computer system of claim 17, further comprising:
   eighth program instructions to receive a biometric reading from a biometric sensor, wherein the biometric reading describes a biometric feature of the new invitee; and
   ninth program instructions to define the status of the new invitee based on the biometric reading for the new invitee; and wherein the eighth and ninth program instructions are stored on the non-transitory computer readable storage medium for execution by one or more processors via the computer readable memory.

19. The computer system of claim 17, further comprising:
   eighth program instructions to receive a positioning reading from a geophysical location sensor, wherein the positioning reading describes a real-time location of the new invitee; and
   ninth program instructions to define the status of the new invitee based on the real-time location of the new invitee; and wherein the eighth and ninth program instructions are stored on the non-transitory computer readable storage medium for execution by one or more processors via the computer readable memory.

* * * * *